United States Patent
Mittelstadt et al.

(10) Patent No.: US 10,635,668 B2
(45) Date of Patent: Apr. 28, 2020

(54) INTELLIGENTLY UTILIZING NON-MATCHING WEIGHTED INDEXES

(71) Applicant: International Business Machines Corporation, Armonk, NY (US)

(72) Inventors: Roger A. Mittelstadt, Byron, MN (US); Brian R. Muras, Otsego, MN (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 15/811,261

(22) Filed: Nov. 13, 2017

(65) Prior Publication Data

US 2018/0129705 A1    May 10, 2018

Related U.S. Application Data

(63) Continuation of application No. 13/940,580, filed on Jul. 12, 2013, now Pat. No. 9,753,975.

(51) Int. Cl.
    *G06F 16/24*     (2019.01)
    *G06F 16/2453*   (2019.01)
(52) U.S. Cl.
    CPC .... *G06F 16/2453* (2019.01); *G06F 16/24537* (2019.01)
(58) Field of Classification Search
    CPC .................................................. G06F 16/2453
    USPC ....... 707/706, 713–719, 722, 723, 736, 758, 707/765, 769, 781, 999.003–999.006; 711/118
    See application file for complete search history.

(56) References Cited

U.S. PATENT DOCUMENTS

| | | |
|---|---|---|
| 7,007,006 B2 | 2/2006 | Zilio et al. |
| 7,529,728 B2 | 5/2009 | Weissman et al. |
| 8,086,610 B2 | 12/2011 | Day et al. |
| 8,121,988 B2 | 2/2012 | Anderson et al. |
| 8,140,517 B2 | 3/2012 | Day et al. |
| 9,753,975 B2 | 9/2017 | Mittelstadt et al. |
| 2009/0182724 A1 | 7/2009 | Day et al. |
| 2010/0257153 A1 | 10/2010 | Day et al. |
| 2010/0318570 A1 | 12/2010 | Narasinghanallur et al. |
| 2011/0082854 A1 | 4/2011 | Eidson et al. |
| 2011/0258225 A1 | 10/2011 | Taylor et al. |
| 2013/0097157 A1 | 4/2013 | Ng et al. |

(Continued)

OTHER PUBLICATIONS

Eswaran et al., "Functional Specifications of a Subsystem for Data Base Integrity", 1975, 21 pages.

*Primary Examiner* — Syling Yen
(74) *Attorney, Agent, or Firm* — Patterson + Sheridan, LLP

(57) ABSTRACT

System, method, and computer program product to perform an operation comprising determining that a sort sequence of a query specifying to access data in a first column of a shared weight object based on a first selection predicate applied to the first column does not match a sort sequence of the shared weight object, adding a second selection predicate to the query based on the sort sequence of the first selection predicate and the shared weight sort sequence of the first column of the shared weight object, and executing the query by using the second selection predicate as a key selection against the first column in the shared weight object to return a result set, wherein the result set does not include a shared weight data value of a first row of the first column that would have been returned using the shared weight object to process the query.

20 Claims, 3 Drawing Sheets

(56) References Cited

U.S. PATENT DOCUMENTS

2015/0019583 A1   1/2015  Mittelstadt et al.
2015/0154254 A1   6/2015  Mittelstadt et al.

INTELLIGENTLY UTILIZING NON-MATCHING WEIGHTED INDEXES

CROSS-REFERENCE TO RELATED APPLICATIONS

This application is a continuation of U.S. patent application Ser. No. 13/940,580 (now U.S. Pat. No. 9,753,975), filed Jul. 12, 2013. The aforementioned related patent application is herein incorporated by reference in its entirety.

BACKGROUND

The present disclosure relates to computer software, and more specifically, to computer software which intelligently utilizes non-matching weighted indexes.

Database customers create indexes over their tables in order to improve performance of the database system when processing queries. The customer may specify one or more database keys to include in the index. The database keys may represent columns that queries will be executed against. The keys may then be built by the database system into the index, with one entry in the index for each row in the table, with a pointer in the index to the row for which the key in the index is a match. When a query is run against the table with selection on the given key, the system can then access the index to find the given rows, instead of touching each row in the table, saving significant time.

Customers may also create a shared weight index, which treats some characters as equals to other characters. For example, uppercase characters may be equal to lowercase characters (e.g., 'A'='a'), so that a query that selects on these characters will retrieve both the upper and lowercase entries. However, when a query is not configured to use a shared weight sort sequence, the DBMS cannot use the shared weight index in processing the query, leading to undesirable system performance.

SUMMARY

Embodiments disclosed herein provide a system, method, and computer program product to perform an operation comprising determining that a sort sequence of a query specifying to access data in a first column of a shared weight object of a database based on a first selection predicate applied to the first column does not match a sort sequence of the shared weight object, adding a second selection predicate to the query based on the sort sequence of the first selection predicate and the shared weight sort sequence of the first column of the shared weight object, and executing the query by using the second selection predicate as a key selection against the first column in the shared weight object to return a result set, wherein the result set does not include a shared weight data value of a first row of the first column that would have been returned using the shared weight object to process the query without the second selection predicate.

DETAILED DESCRIPTION

Embodiments disclosed herein provide techniques to allow a database management system (DBMS) to use a shared weight objects with non-shared weight queries. The shared weight objects include, but are not limited to, shared weight indexes and materialized query tables (MQT). A shared weight object may return unwanted rows as results of a query, as the shared weight treats some characters as equals. For example, if a query specifies to search for "Smith" as a last name, the DBMS may return "smith" with a lowercase "s," which may be an undesired result. When receiving a query that does not specify to use shared weight sequences, embodiments disclosed herein modify the query to apply internal selection to the query, and apply it as a key selection, eliminating unwanted rows that would have been returned by using a shared weight sequence. By modifying the query, embodiments disclosed herein would not return "smith" if the sort sequence of the query specifies that shared weight characters should not be used, yet still allows the DBMS to utilize the shared weight object, improving system performance.

A user submitting a query specifies (knowingly or unknowingly) a session attribute specifying which sort sequence should be used. For example, the sort sequence may be, but is not limited to, shared weight, hexadecimal, or unique. Using a hexadecimal sort sequence means the hexadecimal representations of each character is used as the sort sequence, while a unique sort sequence provides a unique weight for each graphic character. As stated above, a shared weight sort sequence treats some characters as equals, such as upper and lowercase characters. If, for example, a query specifies a hexadecimal sort sequence, and a shared weight index is used to process the query, the shared weights may return upper and lowercase results, even though the hexadecimal values of the upper and lowercase characters do not match. Although embodiments disclosed herein are discussed using indexes as a reference example, embodiments of the disclosure contemplate the reuse of other objects such as a hash table, a materialized query table, and a sort table, and the use of indexes should not be considered limiting of the disclosure.

Figure 1A:
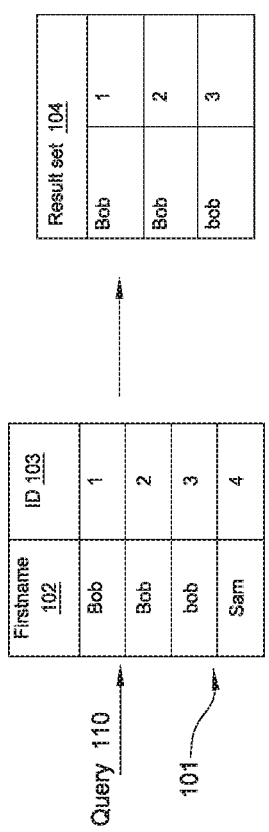
FIGS. 1A-1B are schematics illustrating techniques to intelligently utilize non-matching weighted indexes, according to one embodiment disclosed herein.

FIG. 1A is a schematic 100 illustrating techniques to intelligently utilize non-matching weighted indexes, according to one embodiment disclosed herein. Generally, FIG. 1A depicts a query 110 being applied against a database table 101, which produces a result set 104. The database table 101 may include user first name column 102 and user ID column 103. The database table 101 may be an index table, or a materialized query table (MQT). The query 110 may specify, for example, to select all users having a first name equal to "Bob." The query 110 may also specify a sort sequence of hexadecimal or unique, while the table 101 may be implemented using shared weight sort sequence. If the query 110 is processed using the table 101, undesired results may be included in the result set 104. As shown, the result set 104 includes "Bob" having a user ID of "1," a second "Bob" having a user ID of "2," and a third "bob" having a user ID of "3." However, the inclusion of lowercase "bob" in the result set 104 would be erroneous, as the hexadecimal value of "B" does not equal the hexadecimal value of "b." In light of this situation, embodiments disclosed herein may modify the query 110 such that only the correct rows are included in the result set 104. For example, the query may be modified to include an internal selection to eliminate unwanted rows. Therefore, if the query 110 reads:

```
select firstname 102, id 103
from table 101
where firstname 102 = "Bob"
```

The system may rewrite the query 110 as:

```
select firstname 102, id 103
from table 101
where firstname 102 = "Bob" and hex("Bob") = hex("firstname 102")
```

As shown, the query has been rewritten to include language which compares the hexadecimal values of "Bob" to the hexadecimal value of the name provided in first name column 102 of the table 101. In one embodiment, the query may be rewritten prior to execution. In another embodiment, a key probe may be used to retrieve the shared weight data, returning a first result set, and then in a second step, the system may add the internal selection to filter out a set of rows where the hexadecimal value for "Bob" does not equal the hexadecimal value for the first name in column 102. Therefore, modification may occur at any number of stages of the execution process, such as prior to execution of the query, or in the two-stage process described above. Generally, the system may modify the execution of the query in any feasible manner so that a shared weight index may be used to execute the query even if the query specifies a non-shared weight sort sequence. Doing so may reduce the number of indexes required to operate the database, i.e., a shared weight index, a hexadecimal index, and a unique weight index, allowing the database system to meet performance expectations and requiring less index maintenance.

Figure 1B:
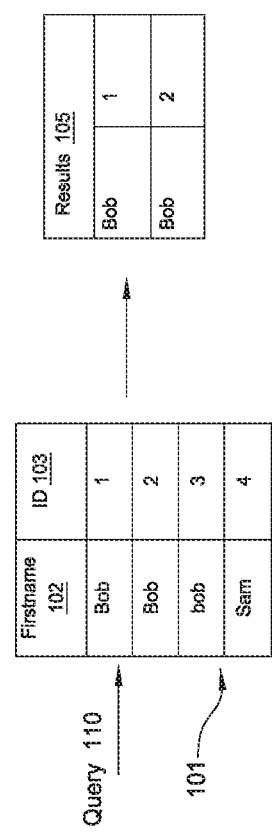

FIG. 1B is a schematic 120 illustrating techniques to intelligently utilize non-matching weighted indexes, according to one embodiment disclosed herein. Generally, the schematic 120 illustrates an embodiment where the query 110, specifying a hexadecimal or unique sort sequence, has been modified such that rows from the table 101 that do not meet the specified sort criteria are not included in the results 105. For example, as described above, the query 110 may request selection of all users having a first name 102 of "Bob." In such an case, the query 110 may be modified to read:

```
select firstname 102, id 103
from table 101
where firstname 102 = "Bob" and hex("Bob") = hex("firstname 102")
```

By modifying the query to include a predicate specifying to match the hexadecimal values, the results set 105 now only includes two rows. As shown, the results set 105 now only includes "Bob" having a user ID of "1," and "Bob" having a user ID of "2." As shown, the result set 105 does not include "bob" having the user ID 3, as the hexadecimal values of "Bob" does not match the hexadecimal value of "bob." In one embodiment, the system may determine whether shared weight conflicts exist in the table (i.e., whether conflicting shared weight values "Bob" and "bob" exist in the table) prior to modifying the query. In such an embodiment, a flag may be set in the column (such as the firstname column 102) to indicate whether any shared weight values exist in the column. The system may reference this flag to determine that no shared weight values exist, and may improve performance by not modifying the query (and subsequently not executing the modified query) when doing so would not eliminate any incorrect values. However, when a value is updated or inserted that is a shared weight value (such as "Bob" and "bob"), the flag may be set, and the system may add the extra selection required to return correct results.

If the query specifies a unique sort sequence, embodiments disclosed herein may take a unique weight table (not pictured), which may be for example 256 bytes, and then character by character in the input string (such as "Bob" in query 110), would look into the table using the numeric value of the character as an index into the table to retrieve the weight. For example, if the first three zero-based values in the unique weight table were 00, 99, and 02, and the input string had hex values of 000102 and 00201, the strings would sort (weigh) as follows:
000201 (with weight 000299)
000102 (with weight 009902)

In one embodiment, a user defined function may be provided to perform the character-by-character lookup against the unique weight table. Once the unique weights are identified, the query 110 may be modified to include a predicate specifying to match the unique weight values of the input string against the unique weight values of a candidate row in the table 101.

As shown, embodiments disclosed herein allow a query to always use a shared weight index, even if there are conflicting characters. In one embodiment, the system may estimate the result set possible with a shared weight index (which may include "bob," for example). If the result set is determined to be small enough, and no hexadecimal index exists in the database, the system may use the shared weight index using key selection to remove the incorrect records (i.e., those having lowercase "bob").

Furthermore, in one embodiment, the system may determine that all indexes in a given schema/table are shared weight, but that the query (or a job) is running either hexadecimal or unique sort sequences. In such an embodiment, after a threshold number of queries are received having hexadecimal or unique sort sequences is exceeded, the system may ask the user to switch their query environment to shared to take advantage of the shared weight indexes. Alternatively, the system may automatically switch the query environment without prompting the user. This intelligence may be turned on or off as required.

Figure 2:
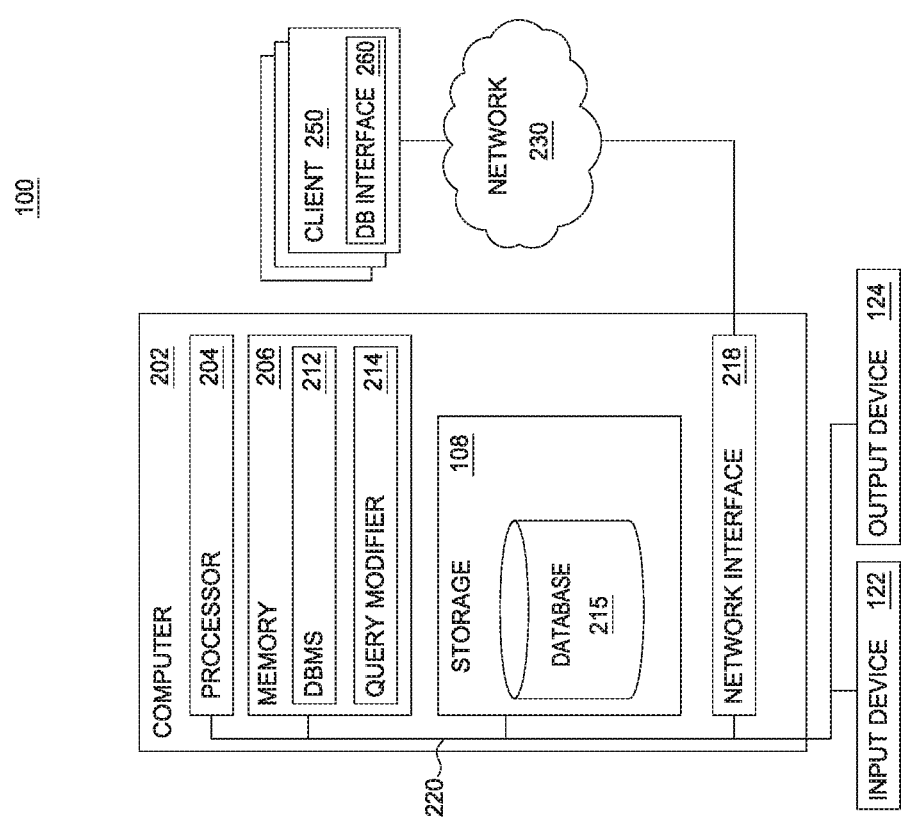
FIG. 2 illustrates a system to intelligently utilize non-matching weighted indexes, according to one embodiment disclosed herein.

Still further, in one embodiment, the system may determine that the use of shared versus hexadecimal or unique does not produce different result sets, the system may state this fact to the user, giving more confidence in auto-switching the environment for the user. In another embodiment, if the system determines that the use of shared versus hexadecimal or unique does produce different result sets, the system may present both results to the user to ensure that the user receives the rows they desire. A sample notification may read:
select firstname 102 from table 101 where firstname 102="Bob" returned two rows that meet your criteria:
Bob
Bob
And one row where the exact case did not match—click here to include this information and merge with your above results (and switch your environment to shared):
bob FIG. 2 illustrates a system 200 to intelligently utilize non-matching weighted indexes, according to one embodiment disclosed herein. The computer 202 may also be connected to other computers, such as client computers 250, via a network 230. In general, the network 230 may be a telecommunications network and/or a wide area network (WAN). In a particular embodiment, the network 230 is the Internet.

The computer 202 generally includes a processor 204 connected via a bus 220 to a memory 206, a network interface device 218, a storage 208, an input device 222, and an output device 224. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. The network interface device 218 may be any type of network communications device allowing the computer 202 to communicate with other computers via the network 230.

The storage 208 may be a persistent storage device. Although the storage 208 is shown as a single unit, the storage 208 may be a combination of fixed and/or removable storage devices, such as fixed disc drives, solid state drives, SAN storage, NAS storage, removable memory cards or optical storage. The memory 206 and the storage 208 may be part of one virtual address space spanning multiple primary and secondary storage devices.

The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used.

As shown, the memory 206 contains a database management system (DBMS) 212, which is a software system generally configured to allow the definition, creation, querying, update, and administration of databases, such as the database 215. Programmers may also write and implement user defined functions as part of the DBMS 212. The memory also includes a query modifier 214, which is an application configured to allow queries specifying non-shared weight sort sequences to use shared weight indexes stored in the database 215. Generally, the query modifier 214 analyzes a session attribute of a query to determine the sort sequence. If the query modifier 214 determines that the query's sort sequence is not shared weight, and that no other matching index exists in the database 215, the query modifier 214 may modify the query, or execution of the query, to allow the DBMS 212 to utilize the shared weight index. For example, the query may be modified to add internal selection based on index keys, eliminating rows that would have incorrectly been returned by using the shared weight index to process a non-shared weight query. The query modifier 214 may also determine that a user, or group of users, have submitted a number of non-shared weight queries that exceed a predefined threshold. In response, the query modifier 214, or the DBMS 212, may change an environment variable on the user's machine such that the queries sent from the machine specify a shared weight sort sequence. Additionally, the user may be prompted to approve the system changing the user's sort sequence. In another embodiment, the query modifier 214 or the DBMS 212 may suggest to the user, or an administrator, to change the sort sequence on their machine. To improve the user experience, the DBMS 212 or the query modifier 214 may inform the user of different information, such as whether modifying the query changed the resultant set of rows. The DBMS 212 or the query modifier 214 may also notify the user that modifying the query did eliminate some rows, and it may present those rows to the user. Although pictured as a standalone application, in one embodiment, the query modifier 214 is a component of the DBMS 212.

As shown, the storage 208 contains a database 215, which is generally configured to store any organized collection of data. The database may store any type of information including, but limited to, tables, user defined functions, and indexes. A plurality of client computers 250 may use a database interface 260 to access the database 215. The database interface may 260 may include, but is not limited to, a command line interface, a program interface, or a web interface.

Figure 3:
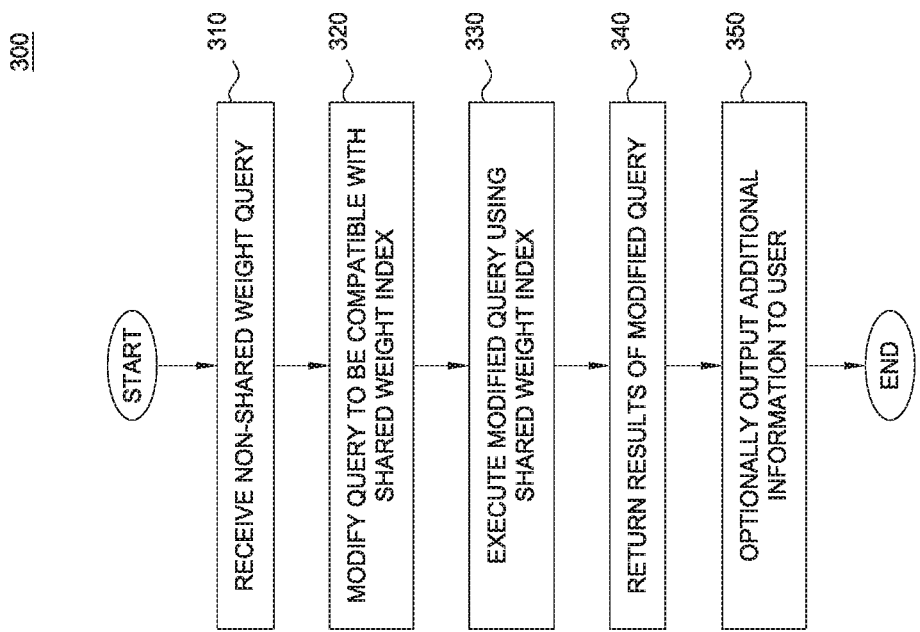
FIG. 3 is a flow chart illustrating a method to intelligently utilize non-matching weighted indexes, according to one embodiment disclosed herein.

FIG. 3 is a flow chart illustrating a method 300 to intelligently utilize non-matching weighted indexes, according to one embodiment disclosed herein. Generally, the method 300 allows a DBMS to process queries using shared weight indexes, even though the queries themselves are not set to use shared weight sort sequences. In one embodiment, the DBMS 212 and the query modifier 214 perform the steps of the method 300.

At step 310, the DBMS 212 receives a non-shared weight query. The query may specify, for example, a hexadecimal or unique sort sequence. If there are no unique or hexadecimal indexes in the database, executing the unmodified query using a shared weight index may return incorrect results. Therefore, at step 320, the query modifier 214 may modify the query to be compatible with the shared weight index. For example, the matching application may add internal selection to the query and apply it as key selection against the shared weight index. As described above, this step may include adding predicates to the query to ensure that the hexadecimal or unique weight values of the query parameters equal the corresponding values in a candidate row. The predicates may be added to the query before or after it is processed. In one embodiment, the DBMS 212 may include a query optimizer that estimates a possible result set using a shared weight index (which may include incorrect results). If the query optimizer determines that the result set is small enough (and can therefore be retrieved very quickly), and that there are no existing hexadecimal or unique indexes, the optimizer may use the shared weight index adding internal selection to remove the records with incorrect data. In one embodiment, the query modifier 214, or the DBMS 212 may reference the shared weight index to determine whether shared weight values actually exist, as there may be no need to modify the query if no shared weight values exist in the shared weight index.

At step 330, the DBMS 212 executes the modified query using the shared weight index. As described above, the DBMS 212 may execute the query in any number of ways. For example, the query may be modified prior to any processing, or the result set may be obtained, and the internal selection may be applied to the result set to eliminate any incorrect records. In one embodiment, materialized query table matching may be implemented. Generally, an MQT may be built and populated, and later referenced in fulfilling a query. The results from the MQT may be joined to, or otherwise merged with the query results. Thus, if a query specifies hexadecimal or unique sort sequences, and the MQT matches, but the MQT results are shared, internal selection may be applied to the hexadecimal or unique weight values of the MQT results to ensure the incorrect results are eliminated. At step 340, the DBMS 212 may return the results of the modified query. At step 350, the DBMS 212 or the query modifier 214 may optionally output additional information to the user. For example, the additional information may indicate whether additional rows were eliminated by modifying the query, and if so, those rows may be presented to the user.

Advantageously, embodiments disclosed herein allow different types of queries to use shared weight indexes in a DBMS. If a query is received that does not specify shared weight sort sequences, the query may be modified to include logic which specifies to eliminate rows that the DBMS would otherwise incorrectly return as responsive to the query. Therefore, embodiments disclosed herein allow many indexes to be used that would otherwise go unused in executing queries. Overall system performance may be improved by using a shared weight index where other indexes are not available, and by reducing the size and maintenance requirements of providing multiple types of indexes. Additionally, the correct results may be returned without executing the unmodified query.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access database applications or related data available in the cloud. For example, the matching application could execute on a computing system in the cloud and allow non-shared weight queries to use shared weight indexes. In such a case, the matching application could modify non-shared weight queries and store the query results at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    determining that a sort sequence of a query that accesses data in a first column of a shared weight object of a database based on a first selection predicate applied to the first column does not match a sort sequence of the shared weight object;
    identifying, before modifying the query, a shared weight conflict in the shared weight object in the database based on a flag being set in the first column of the shared weight object indicating that shared weight values exist in the first column of the same shared weight object to be queried;
    responsive to identifying the shared weight conflict, modifying the query by adding a second selection predicate to the query based on the sort sequence of the first selection predicate and the shared weight sort sequence of the first column of the shared weight object; and
    executing the query by using the second selection predicate as a key selection against the first column in the shared weight object to return a result set, wherein the result set does not include a shared weight data value of a first row of the first column that would have been returned using the shared weight object to process the query without the second selection predicate.

2. The method of claim 1, wherein the second selection predicate, when executed, excludes the first row that would have been returned using the shared weight object to process the query without the second selection predicate, wherein the first column of the shared weight object includes shared weight data values, wherein the second selection predicate is applied to the first column of the shared weight object, wherein the first column of the first row comprises the shared weight data value, wherein the shared weight object comprises each individual object selected from: (i) an index, and (ii) a materialized query table, wherein the second selectin predicate is added to the query upon determining that at least one shared weight value exists in the shared weight object, wherein the query without the second selection predicate is not executed to obtain the result set.

3. The method of claim 1, wherein the sort sequence of the query is hexadecimal, wherein the using the second selection predicate as a key selection against the shared weight object comprises determining whether a hexadecimal value of a first variable specified in the second selection predicate equals a hexadecimal value of a corresponding value in the first column of the shared weight object of the database.

4. The method of claim 1, wherein the sort sequence of the query is unique, the method further comprising:
    retrieving a weight for each character in a first variable specified in the query; and
    adding a predicate to the query specifying to determine whether the weight of the first variable matches the weight for each character of a column corresponding to the first variable in a candidate row in the database.

5. The method of claim 1, further comprising prior to adding the second selection predicate to the query:
    executing the query to retrieve the set of rows; and
    outputting for display the set of rows and a notification that at least one value of the set of rows does not satisfy the sort sequence of the query.

6. The method of claim 1, further comprising:
    modifying a query environment variable of a user upon determining that a number of received queries from the user having sort sequences that do not match the sort sequence of the shared weight object exceeds a predefined threshold.

7. The method of claim 1, further comprising:
upon determining that the set of rows is an empty set, notifying a user that no results in the result set includes values that do not satisfy the sort sequence of the query.

8. A system, comprising:
one or more computer processors; and
a memory containing a program which when executed by the one or more computer processors performs an operation, the operation comprising:
determining that a sort sequence of a query that accesses data in a first column of a shared weight object of a database based on a first selection predicate applied to the first column does not match a sort sequence of the shared weight object;
identifying, before modifying the query, a shared weight conflict in the shared weight object in the database based on a flag being set in the first column of the shared weight object indicating that shared weight values exist in the first column of the same shared weight object to be queried;
responsive to identifying the shared weight conflict, modifying the query by adding a second selection predicate to the query based on the sort sequence of the first selection predicate and the shared weight sort sequence of the first column of the shared weight object; and
executing the query by using the second selection predicate as a key selection against the first column in the shared weight object to return a result set, wherein the result set does not include a shared weight data value of a first row of the first column that would have been returned using the shared weight object to process the query without the second selection predicate.

9. The system of claim 8, wherein the second selection predicate, when executed, excludes the first row that would have been returned using the shared weight object to process the query without the second selection predicate, wherein the first column of the shared weight object includes shared weight data values, wherein the second selection predicate is applied to the first column of the shared weight object, wherein the first column of the first row comprises the shared weight data value, wherein the shared weight object comprises each individual object selected from: (i) an index, and (ii) a materialized query table, wherein the second selectin predicate is added to the query upon determining that at least one shared weight value exists in the shared weight object, wherein the query without the second selection predicate is not executed to obtain the result set.

10. The system of claim 8, wherein the sort sequence of the query is hexadecimal, wherein the using the second selection predicate as a key selection against the shared weight object comprises determining whether a hexadecimal value of a first variable specified in the second selection predicate equals a hexadecimal value of a corresponding value in the first column of the shared weight object of the database.

11. The system of claim 8, wherein the sort sequence of the query is unique, the operation further comprising:
retrieving a weight for each character in a first variable specified in the query; and
adding a predicate to the query specifying to determine whether the weight of the first variable matches the weight for each character of a column corresponding to the first variable in a candidate row in the database.

12. The system of claim 8, the operation further comprising prior to adding the second selection predicate to the query:
executing the query to retrieve the set of rows; and
outputting for display the set of rows and a notification that at least one value of the set of rows does not satisfy the sort sequence of the query.

13. The system of claim 8, the operation further comprising:
modifying a query environment variable of a user upon determining that a number of received queries from the user having sort sequences that do not match the sort sequence of the shared weight object exceeds a predefined threshold.

14. The system of claim 11, the operation further comprising:
upon determining that the set of rows is an empty set, notifying a user that no results in the result set includes values that do not satisfy the sort sequence of the query.

15. A computer program product, comprising:
a computer-readable non-transitory storage medium having computer-readable program code embodied therewith, the computer-readable program code executable by a processor to perform an operation comprising:
determining that a sort sequence of a query that accesses data in a first column of a shared weight object of a database based on a first selection predicate applied to the first column does not match a sort sequence of the shared weight object;
identifying, before modifying the query, a shared weight conflict in the shared weight object in the database based on a flag being set in the first column of the shared weight object indicating that shared weight values exist in the first column of the same shared weight object to be queried;
responsive to identifying the shared weight conflict, modifying the query by adding a second selection predicate to the query based on the sort sequence of the first selection predicate and the shared weight sort sequence of the first column of the shared weight object; and
executing the query by using the second selection predicate as a key selection against the first column in the shared weight object to return a result set, wherein the result set does not include a shared weight data value of a first row of the first column that would have been returned using the shared weight object to process the query without the second selection predicate.

16. The computer program product of claim 15, wherein the second selection predicate, when executed, excludes the first row that would have been returned using the shared weight object to process the query without the second selection predicate, wherein the first column of the shared weight object includes shared weight data values, wherein the second selection predicate is applied to the first column of the shared weight object, wherein the first column of the first row comprises the shared weight data value, wherein the shared weight object comprises each individual object selected from: (i) an index, and (ii) a materialized query table, wherein the second selectin predicate is added to the query upon determining that at least one shared weight value exists in the shared weight object, wherein the query without the second selection predicate is not executed to obtain the result set.

17. The computer program product of claim 15, wherein the sort sequence of the query is hexadecimal, wherein the using the second selection predicate as a key selection against the shared weight object comprises determining whether a hexadecimal value of a first variable specified in the second selection predicate equals a hexadecimal value of a corresponding value in the first column of the shared weight object of the database.

18. The computer program product of claim 15, wherein the sort sequence of the query is unique, the operation further comprising:
    retrieving a weight for each character in a first variable specified in the query; and
    adding a predicate to the query specifying to determine whether the weight of the first variable matches the weight for each character of a column corresponding to the first variable in a candidate row in the database.

19. The computer program product of claim 15, the operation further comprising prior to adding the second selection predicate to the query:
    executing the query to retrieve the set of rows; and
    outputting for display the set of rows and a notification that at least one value of the set of rows does not satisfy the sort sequence of the query.

20. The computer program product of claim 19, the operation further comprising:
    modifying a query environment variable of a user upon determining that a number of received queries from the user having sort sequences that do not match the sort sequence of the shared weight object exceeds a predefined threshold.

* * * * *